Patented Jan. 31, 1933

1,895,641

UNITED STATES PATENT OFFICE

LEVI SCOTT PADDOCK, OF CHICAGO, ILLINOIS, ASSIGNOR TO SWIFT & COMPANY, OF CHICAGO, ILLINOIS, A CORPORATION OF ILLINOIS

BRANDING MEAT PRODUCTS

No Drawing. Application filed March 20, 1929. Serial No. 348,673.

This invention relates to the branding of meat products, and particularly smoked meats such as hams and bacons; and comprises a new, simple and practical method of stamping or branding such meat products whereby a jet black brand will be sharply delineated on the meat products.

The original method of branding the skin side of smoked meats, such as hams and bacons, was by the application of a hot branding iron. In later methods of branding, inks and dyes have been used as substitutes for hot branding. One branding composition which has been so used has consisted of a mixture of methyl violet, lamp black and a binder or adhesive such as glucose, sugar, or a vegetable gum.

When a branding iron is employed, it is necessary to heat the iron to a high temperature, and the branding is effected by impressing the hot branding iron on the meat, so that the meat will be burned or seared, and the impression produced will be indistinct. The branding inks commonly employed, containing methyl violet, etc. are affected by the moisture or the fat of the meat or both, and do not affix themselves sufficiently to the meat surface to prevent running. The result is that the meat, branded with such inks, has an irregular and streaky and smeary appearance.

The present invention overcomes the objections of the prior methods of branding and provides a new and improved method by which the meats can be stamped in an entirely satisfactory manner, with the avoidance of any streaky or smeary appearance on the branded meats. The imprint of the brand obtained by this method appears in jet black color and sharp delineation. My improved process combines the advantages but overcomes the objections, of prior branding processes such as those above mentioned.

I have found that a dye known as nigrosine, and particularly the dye known as nigrosine, spirit soluble, has none of the disadvantages of methyl violet and similar dyes, and that its use enables a superior branding of the meat to be effected. Nigrosine is only slightly soluble in water or neutral fats, and hence, when applied to a meat surface has no tendency either to smear or to run. Accordingly, when applied to the meat, it gives not only a jet black brand, but one with sharp delineation.

For use in my invention I find that simple alcohol solutions are less satisfactory than more viscous solutions and those containing higher concentration of the dye than are possible with the use of alcohol alone.

One such composition which gives excellent results when used for branding meats is as follows, the parts being by weight:—

A mixture of 7 parts of nigrosine, spirit soluble, 19 parts of dynamite glycerine (that is, glycerine of high purity free from sulfuric acid, chlorine, lime and arsenic) and 6 parts of glacial acetic acid are heated together at a temperature of around 160 to 180° F. for several hours, conveniently overnight. There are then added 68 parts of alcohol, and for this purpose I find the denatured alcohol known as 13—A made up of 10 parts of ethyl ether to 90 parts of ethyl alcohol to be most satisfactory. The resulting composition is then ready for use.

In using the nigrosine ink, it can be stamped on the meat with the use of ordinary branding stamps, such as a rubber stamp or the equivalent and particularly on the external surfaces or skin of meats, such as smoked hams and bacons. Such meat surfaces have alternating moist and fatty portions, but since the nigrosine employed is practically insoluble in both neutral fat and in water, it does not run or smear. The brand is therefore clear and distinct, with sharp delineation, and it is moreover of a jet black color.

I claim:

1. An ink adapted for use on greasy or moist surfaces which comprises 7 parts of nigrosine spirit soluble digested with 19 parts of substantially pure glycerine and six parts of glacial acetic acid and the resulting product dissolved in 68 parts of alcohol.

2. Manufactured meat products containing moisture and fatty material having a sharply delineated brand of a substantially fat and water insoluble nigrosine dye.

3. Manufactured meat products containing moisture and fatty material branded with a substantially fat and water insoluble branding composition comprising nigrosine, spirit soluble, the brand being jet black in color and sharply delineated.

4. An ink adapted for use on moist or greasy surfaces comprising a material consisting of nigrosine, spirits soluble, digested with glycerine and acetic acid, said material being dissolved in alcohol in such proportions as to form a sharply delineated brand on hams and bacons.

5. Smoked meat products containing moisture and fatty material having a sharply delineated brand of a substantially fat-and water-insoluble nigrosine dye.

In testimony whereof I affix my signature.

LEVI SCOTT PADDOCK.